US009123067B2

(12) United States Patent
Deyle et al.

(10) Patent No.: US 9,123,067 B2
(45) Date of Patent: Sep. 1, 2015

(54) METHOD AND SYSTEM FOR VERIFYING THE AUTHENTICITY OF GOODS OVER AN INTERNET

(71) Applicant: Lollipuff LLC, Durham, NC (US)

(72) Inventors: Fei L. Deyle, Durham, NC (US); Travis J. Deyle, Durham, NC (US)

(73) Assignee: Lollipuff LLC, San Jose, CA (US)

( * ) Notice: Subject to any disclaimer, the term of this patent is extended or adjusted under 35 U.S.C. 154(b) by 389 days.

(21) Appl. No.: 13/680,804

(22) Filed: Nov. 19, 2012

(65) Prior Publication Data

US 2014/0143090 A1   May 22, 2014

(51) Int. Cl.
G06Q 99/00 (2006.01)
G06Q 30/06 (2012.01)
G06Q 10/08 (2012.01)
G06Q 30/00 (2012.01)

(52) U.S. Cl.
CPC ........ G06Q 30/0609 (2013.01); G06Q 10/0833 (2013.01); G06Q 30/00 (2013.01); G06Q 30/0623 (2013.01); G06Q 30/0625 (2013.01); G06Q 30/0627 (2013.01)

(58) Field of Classification Search
CPC .......... G06Q 30/0609; G06Q 30/0623; G06Q 30/0625; G06Q 30/0627; G06Q 30/00
USPC ..................................... 705/50, 26.63, 26.35
See application file for complete search history.

(56) References Cited

U.S. PATENT DOCUMENTS

| | | | | |
|---|---|---|---|---|
| 4,972,475 | A * | 11/1990 | Sant'Anselmo | 380/54 |
| 6,886,748 | B1 * | 5/2005 | Moore | 235/435 |
| 8,505,108 | B2 * | 8/2013 | Rhoads | 726/34 |
| 2004/0022444 | A1 * | 2/2004 | Rhoads | 382/232 |
| 2004/0149823 | A1 * | 8/2004 | Aptekar | 235/385 |
| 2006/0109515 | A1 * | 5/2006 | Zhao et al. | 358/3.28 |
| 2007/0200929 | A1 * | 8/2007 | Conaway, Jr. | 348/157 |
| 2011/0211727 | A1 * | 9/2011 | Costa et al. | 382/100 |
| 2012/0319815 | A1 * | 12/2012 | Feldman | 340/5.8 |

FOREIGN PATENT DOCUMENTS

WO    WO01/18677 A2    3/2001

* cited by examiner

*Primary Examiner* — James D Nigh
(74) *Attorney, Agent, or Firm* — Fenwick & West LLP

(57) ABSTRACT

The present invention relates to a system and method for authenticating a good and determining if the good is in the seller's possession. It relies on a web-based authentication service that requires the seller to provide photos of key features specific to the item, along with an identification number, specific to the item that must be present in each photo. The present invention applies to goods sold either in person, in a retail store, or over the internet.

19 Claims, 4 Drawing Sheets

METHOD AND SYSTEM FOR VERIFYING THE AUTHENTICITY OF GOODS OVER AN INTERNET

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to the identification of the authenticity of goods over the internet. The present invention particularly relates to a method and system for authenticating goods over the internet involving authentication pictures and identification numbers, and the like regardless of how the goods are sold.

2. Description of Related Art

The sale of goods over the internet has grown substantially over the past decade. Goods purchased via e-commerce come from a variety of sources including wholesale, retail from established business and non-established business, auction houses, resellers, individual sellers, and the like. In some areas, more goods are purchased online than in conventional brick and mortar retail establishments. Along with this rapid growth of goods sold over the internet is a rapidly growing problem with the inability to tell the difference between authentic goods being offered for sale and counterfeit goods. This is especially true with designer clothing and with designer clothing accessories, such as purses and the like. One advantage of brick and mortar outlets is that the buyer can physically inspect the goods offered for sale. On the other hand, while the purchaser will likely see a picture and description of the product being offered for sale over the internet, this is no guarantee that the product is not counterfeit, off-grade, out of specification, stolen, or a guarantee that the goods are even in the seller's possession. It is also likely that the seller may be unfamiliar with the particulars of an item or its brand (i.e. not an expert in identification of the goods). Plus, the seller may not be aware of the authenticity of the goods they possess (authentic or counterfeit), since the seller may have purchased goods with the same purchase issues. Further, pictures can easily be digitally doctored or taken from the internet, making it difficult to determine if the goods are originals and in the seller's possession.

To address the purchaser's concern, several methods, systems and the like have been developed, all with varying success and applicability. Various forms of honesty checks of the seller are used to determine the past performance in selling goods. However, as noted above even the seller may not be aware of the problem of authenticity and unless the purchaser is sophisticated, this method may not solve the problem. In addition, the manufacturer may include indicia of authentic manufacture like a certificate, tag or the like, but this does not guarantee the seller has the product in hand and doesn't solve the problem for sale of used goods or goods without any indicia that are indeed authentic. Because this is especially a problem with high value luxury products and products with high recognition value, the value of goods misidentified has reached unmanageable levels. Accordingly, there is still a huge need for a method or system to protect purchasers, to make certain the goods they are considering for purchase are both authentic and in the seller's possession.

BRIEF SUMMARY OF THE INVENTION

The present invention relates to the discovery that one or more photos, each photo having one or more key features, can be used to authenticate goods. Even further, if the photos of the goods are accompanied by an independently-generated identification number produced just for the particular item, then the photos can be authenticated as goods within the seller's possession.

In one embodiment of the invention, there is an authentication process for the authentication of a good over the internet, with the good in the possession of a seller, which is being sold to a purchaser, the authentication process using an authentication service comprising:
 a) the authentication service connected to internet via a server and issuing an identification number for the good to the seller;
 b) the authentication service instructing the seller to provide one or more photos of the goods, each photo having one or more key features which can be used to identify the authenticity of the good, and each photo having the identification number in the photo;
 c) the seller providing the requested photos to the authentication service;
 d) the authentication service comparing the photos to known key features of the good and determining if the good is in the hands of the seller and an authentic good; and
 e) providing the authentication result to at least one of the seller or purchaser.

In another embodiment of the invention, there is a web based system for the authentication of a good over the internet which is being sold to a purchaser, the authentication process using an authentication service comprising:
 a) the authentication service server connected to the internet via a server and issuing an identification number for the good to the seller;
 b) the authentication service server instructing the seller to provide one or more photos of the goods, each photo having one or more key features which can be used to identify the authenticity of the good, and each photo having the identification number in the photo:
 c) the seller providing the requested photos to the authentication service server;
 d) the authentication service server comparing the photos to known key features of the good on the server and determining if the good is in the hands of the seller and an authentic good; and
 e) providing the authentication result to at least one of the seller or purchaser.

DETAILED DESCRIPTION OF THE INVENTION

Figure 1:
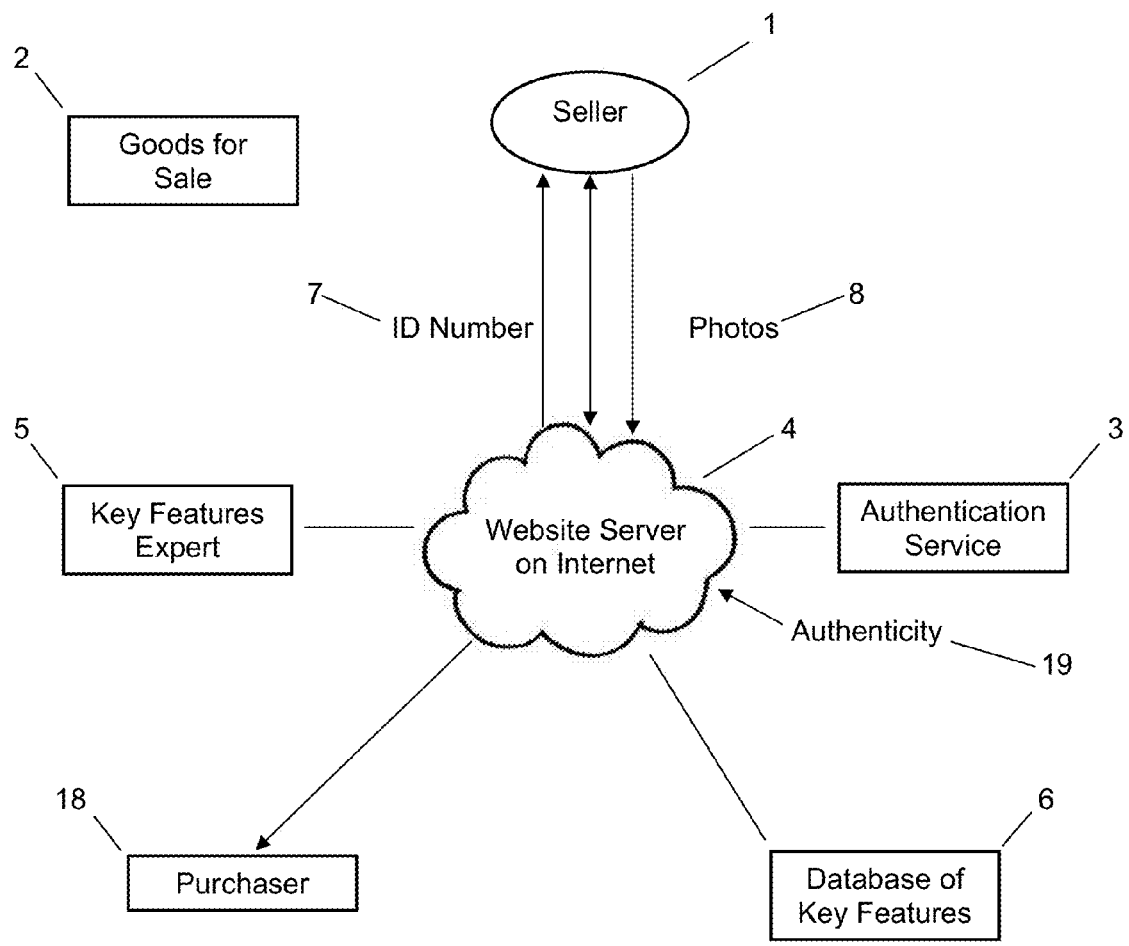
FIG. 1 is a relationship figure of the system of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "authentication" refers to determining the likelihood that a given good (any kind of product) being offered for sale by a seller is not a counterfeit item (including grey market goods) and that the good is in the possession of the seller at or near the time of selling it. In general, the process could be used for any good sold: over the internet, from a retail store, person to person, or the like. It could also be utilized to determine the condition of the good being sold. In one embodiment, it relates to luxury goods such as designer clothing and clothing accessories. The present system and method includes photos of the good and in some embodiments, manufacturer provided information and tags. In some embodiments, the authentication process could return a result of: "authentic," "not authentic," or in some cases "uncertain." In some embodiments, authentication can include a degree of certainty about the authenticity of a good.

As used herein "purchaser" refers to one or more potential purchasers of a good or a person who has already purchased a good.

As used herein the term "authentication service" is a service offered over the internet for the purpose of providing an authentication of goods sold to sellers, purchasers or both. An "internet server" refers to a computer with an internet connection which is administered by the authentication service.

As used herein the "identification number" is a number generated by the authentication service of the present invention which is used with the photos provided by the seller of the good in order to determine if the photos being provided are current in time and that the seller is somehow in possession of the good being sold. Accordingly, the number would have a life beyond when it has little or no value. By keeping track of the issue date of the identifier, the time and age of the photos can be determined. Like any number of this type, identification numbers should be difficult to guess and should be drawn from a sufficiently large set of possible identifiers to prevent the seller from taking photos with all possible identifiers. One way of obtaining such a number is using a random or pseudo random number. While this is not a requirement of the identification number, it does prevent someone working for the authentication service giving away the authentication numbers in advance. In one embodiment, the random identification number is compared to other identification numbers to make sure each number is unique.

An identification number can take on any reasonable forms, such as a string of digits, characters, alphanumeric characters, or other symbols. It could also be an image drawn from a set of images. Further, it could be represented as a machine-readable barcode, QR code or the like to provide a coded identifier, so that it can be automatically identified by computer software. Identifiers can be created by any reasonable means for generating secure numbers, such as: computer generation, cryptographic hashes of a data object(s), and the like. The information used to create the identifier could include: existing product/good identifiers (e.g. UPC codes, unique identifiers, or style numbers), the current date and time, and the like. The identification number needs to be something that is not easily a priori guessable.

As used herein "photos of key features" refers to the authentication service requesting one or more photos of the good, each photo showing one or more key features. In one embodiment, the identification number (which may be present in each photo) could also be considered a key feature. The key features taken together are used to authenticate the good and will differ significantly between individual items. Therefore, the authentication service must amass either a large database, employ an expert of some kind, or both such that as each product is presented for authentication, the key features can be determined. For example, the features can vary greatly between dresses, shoes, purses, watches and the like. Features can also vary greatly between individual designers or manufacturers (such as differences between Chanel and Louis Vuitton), and can vary between products of different styles from the same manufacturer. Following are examples for three different designer clothing items:

Christian Louboutin shoes may require photos of the: insole, sole, side profile, back heel with shoes lined up next to each other, dust bag, shoebox, and item sticker if applicable, and the like.

Chanel bags may require photos of the: front, back, top, bottom, sides, isometric view, hardware (zippers, clasps, etc.), stitching, embossing, logos, stamps, manufacturer-provided serial numbers/codes/style names/ID numbers/style numbers/factory numbers, labels, barcodes, QR codes, and the like.

Herve Leger dresses may require photos of the: front, back, item turned inside out, Herve Leger tag, all sides of care label(s), price tag with barcode facing up (if applicable), hang tags, zippers, fasteners, stitching, cloth close-ups, banding patterns and sizes, and the like.

Using the Herve Leger dress as a more detailed example, one or more key visible features may be depicted in each photo. A photo of the front view of dress may include features such as: style details, embellishment types, color, band pattern and widths, dress condition, and the like. A photo of the back view of dress may include features such as: style type, color, embellishment types, band pattern and widths, dress condition, and the like. A photo of the backside of dress turned inside out may include features such as: style type, stitching pattern, color, band pattern and widths, dress condition, and the like. A photo of the clothing tag may include features such as: cloth material, color, cloth grain, font size, font type, stitching to dress, other tag details particular to the designer, season, year of production, and the like.

Again, as noted the photos are accompanied by the identification number. Other pieces of information could also be included or extracted from the photos of key features such as date and time, geolocation, camera used, camera's make or model, camera software version, resolution, compression ratio, and the like to help aid in authentication and to verify that the photos have not been altered in any way. The photos are then loaded onto the server of the authentication service and the system can automatically or manually categorize and store the photos according to features. They can also be categorized according to brand, serial number, style number, etc. and used to determine if the good is authentic, counterfeit, or undetermined. The result can be transmitted to the seller, the buyer or anyone else as desired.

In one embodiment, the key features could be visible machine-readable tags applied by the manufacturer. Examples include barcodes and QR codes. These tags may be used to indicate style or serial numbers. Often, they are provided to expressly aid identification and authentication, e.g. using cameras (or mobile devices running "apps" with camera functionality) or barcode scanners to lookup an item's price for invoicing purposes. Other times, these tags contain elements such as holograms to combat counterfeiting.

As used herein "authentication score" refers to the authentication service determining whether a good is authentic, counterfeit, or undetermined. In one embodiment the system uses a database to determine a score (for example, between 0% and 100%) about the likelihood of authenticity for the item based on the information provided by the visible features. For example, it may be known that a certain style number is frequently counterfeited. Any item claiming this style number may receive a low score (10%) and merit more critical examination. Meanwhile, a unique serial number confirmed by a manufacturer-provided database may receive a very high score (95%).

The database (and authentication scores) used by the present invention may be obtained through historical information built up within the system using previously-determined authentic (or counterfeit) items, provided by the manufacturer themselves, or provided by a third party application that maintains the unique serial numbers.

In recent years, electronic chip-based technologies offer a (non-visual) element to supplement the visual elements. These devices require a "reader" to communicate with (and in some cases power-up) "electronic tags" via electromagnetic fields. By embedding electronic tags in (or attaching them to) luxury goods, manufacturers may provide additional authentication mechanisms. The electronic tags may directly provide "cleartext" identification information such as style numbers and/or unique serial numbers. This is typically the case for the various forms of Radio Frequency Identification (RFID) tags that operate at short range (e.g. low-frequency (LF) and high-frequency (HF) RFID tags) and long range (e.g. ultra-high frequency (UHF) RFID tags). However, a new class of Near Field Communication (NFC) tags also offers a cryptographic authentication mechanism, which allows a NFC reader to confirm the tag's identity using an encrypted "shared secret" rather than transmitting the unique serial number in "cleartext."

As electronic chip-based technologies become more commonplace, tag readers proliferate. Several commercially-available mobile phones already come equipped with LF and HF RFID readers as well as NFC readers. The actual encrypted information on these tags is generally not known to sellers. In one embodiment, sellers are tasked (where applicable) to use RFID/NFC readers (either connected to a PC running a trusted application or through a mobile phone with NFC capabilities running a trusted "app") to communicate the electronic chip-based identifiers. Again, the present invention could use a database to determine a score (for example, between 0% and 100%) about the authenticity of the item based on the information provided by the electronic chip-based elements. For example, a LF RFID tag that is known to be commonly counterfeited may receive a low score (10%) that would cause visual examination to be more rigorous, while a NFC tag looked up in a database provided by the manufacturer may receive a very high score (say, 95%).

The database (and authentication scores) used by the present invention for electronic tags may also be obtained through historical information built up using previously-determined authentic (or counterfeit) items, provided by the manufacturer themselves or provided by a third party application that maintains the unique serial numbers and/or cryptographic keys.

One crucial benefit of the present invention is that it continues to function even if an electronic (or visible) indicia are absent or not functional, as the present invention accounts for a wide variety of factors to ascertain a product's authenticity. This is a key benefit over systems that rely exclusively on electronic (or visible) identifiers. The information provided by visible and electronic machine-readable tags is stored in the database on a server or other related computer and associated with the categorized and stored images for a particular item.

Determining the authenticity of a luxury good often requires an expert eye based on years of experience and an extensive history working with a particular designer or a particular brand. This creates additional challenges for the present invention. Plus, becoming an expert often involves collaborating with other known experts in the field. Over time, the present invention captures salient information about luxury goods, to build a corpus (database) of information that can greatly enhance an expert's or the present invention's working set of examples (i.e. known authentic or counterfeit goods for comparison) and quickly allow novices to exhibit (or acquire) expert authentication skills. Furthermore, this database enables the present invention to apply machine learning techniques to compare and contrast new items with known examples, allowing the service to automate (or semi-automate) the authentication process. Each feature of an item submitted for authentication (e.g. key visual features, electronic features, digital forensics, and machine-readable tag information) is categorized and stored in our system along with the ultimate determination of "authentic", "counterfeit", or "uncertain".

When a new item (and its associated information) is submitted for authentication, the present invention automatically retrieves numerous similar examples from the database. This information can be presented to a human authenticator for side-by-side comparison. In other cases, the present invention can automatically extract information about the historical examples to estimate a score about the authenticity of an item (for example, between 0% and 100%). This score could be used to assist the human authenticator, or it could be used directly (with a threshold) to authenticate the item.

A scoring method would combine scores about the various visible features (and the presence of the required identification number in each), absence of photo-manipulation, information about the machine-readable tags, the seller's online history (reputation), and other factors to provide a combined-confidence about the authenticity of a luxury good. If the score exceeds a certain threshold, it may be deemed "authentic" or "counterfeit". If "uncertain", a human authenticator may be consulted for final judgment. The resulting classification and likelihood/confidence is stored alongside all the supporting features for the item to assist subsequent authentication requests.

In one embodiment of the present invention the authentication service provides the seller with an "authentication certificate." This certificate can be provided (e.g. printed or sent as a photo or webpage) to potential buyers as proof of authenticity. The certificate may supply any subset of the following information: item photos (potentially with the verification code), item description, seller ID, seller affiliation (i.e. company name), seller item number, random identification code, identification code creation date, identification code expiration date, authenticity determination, and pointers to a trusted third-party application or website that contains the original authentication certificate.

This last item is particularly important. Potential buyers should not rely on the certificate supplied by the seller alone. It would be far too easy for an unscrupulous seller to fake the certificate. For this reason, each certificate contains a pointer to a trusted application or website of the present invention where potential buyers can obtain the original authentication certificate provided by the present invention. This pointer could take the form of an internet uniform resource locator (URL, or web address) or a QR code containing the URL. In another embodiment, the link or QR code or RFID/NFC tag could be used by a trusted mobile phone application (app) to confirm the authenticity of both the item and the certificate.

Now referring to the figures, FIG. 1 is a relationship chart of the present invention's authentication system. A seller 1 has a good that is being offered for sale 2. The seller 1 logs onto the authentication service 3 server 4 website. The ID number 7 (identification number) is provided to seller 1 through the authentication service 3 server 4 website. The seller is prompted to provide photos 8 of the good 2 with the ID number 7 to the authentication service 3. The photos 8 are then transmitted from seller 1 to the website server 4 and key features are compared with data from expert 5 and/or database 6 and a report on the authenticity 19 is delivered to the website server 4 so that the seller 1 or the purchaser 18 of the good may see the authentication.

Figure 2:
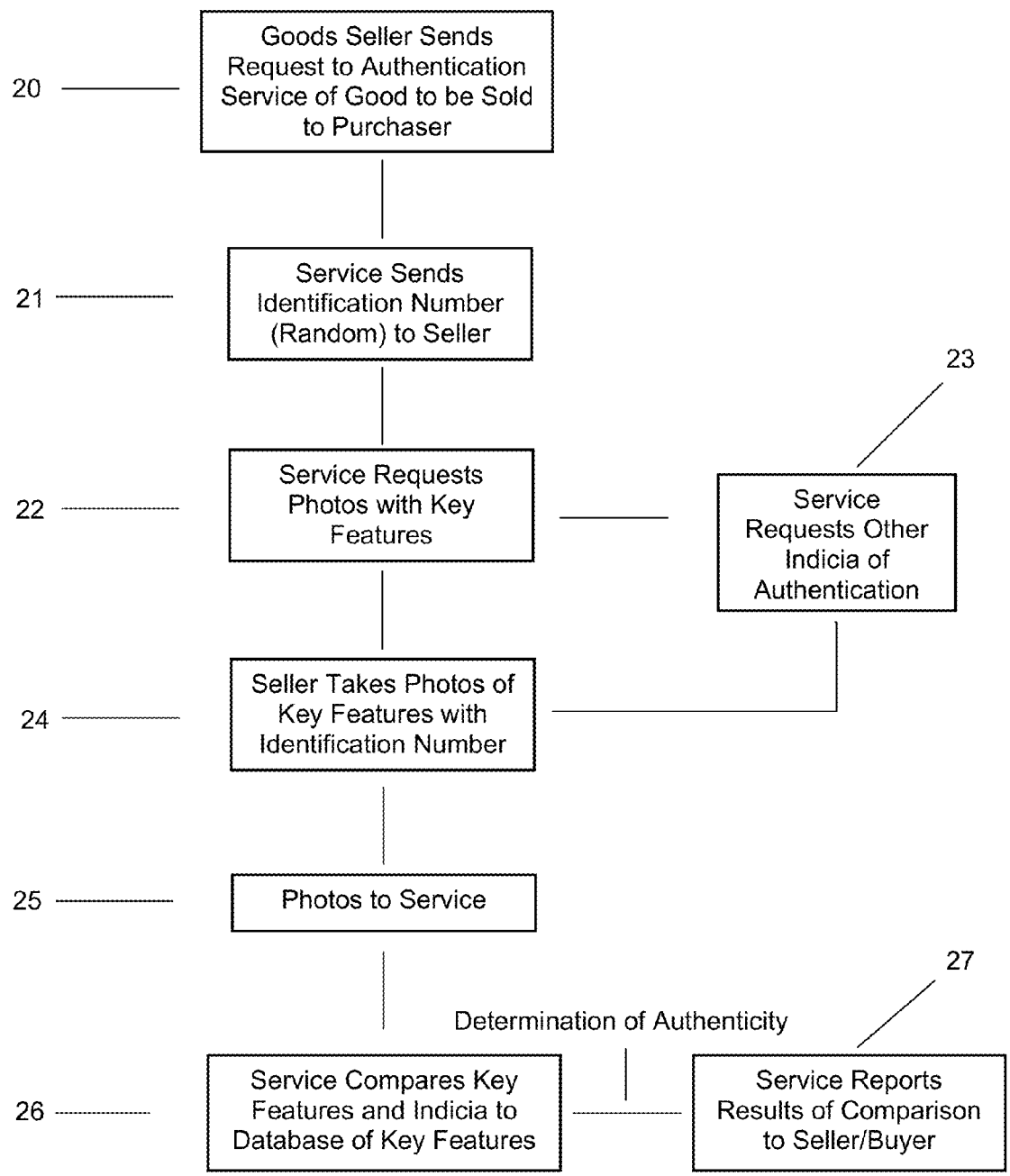
FIG. 2 is a flow chart of the use of the present system.

FIG. 2 is a flow chart of the process of obtaining authentication of a good. A goods seller sends a request to the authentication service of goods to be sold by the seller to a purchaser 20. The service then sends an ID number (identification number, such as a random number) to the seller 21. Then, upon determining what the good is, the service requests photos from the seller with key features and the ID number 22. It is also possible that the service requests other indicia of authenticity 23 such as manufacturer tags or machine-readable tags. The seller then takes photos 24 and then sends the photos to the service 25 (such as over the internet) to a service website. The service takes the photos and compares the key features and indicia to key features stored in the database and expert-known key features 26. The service determines authenticity and reports the results of the comparison to the seller/buyer 27.

Figure 3:
FIG. 3 is a screenshot of the website information including an identification number.

FIG. 3 is a sample screen shot of a website page of the authentication service which has generated a random identification number for use with the pictures.

Figure 4:
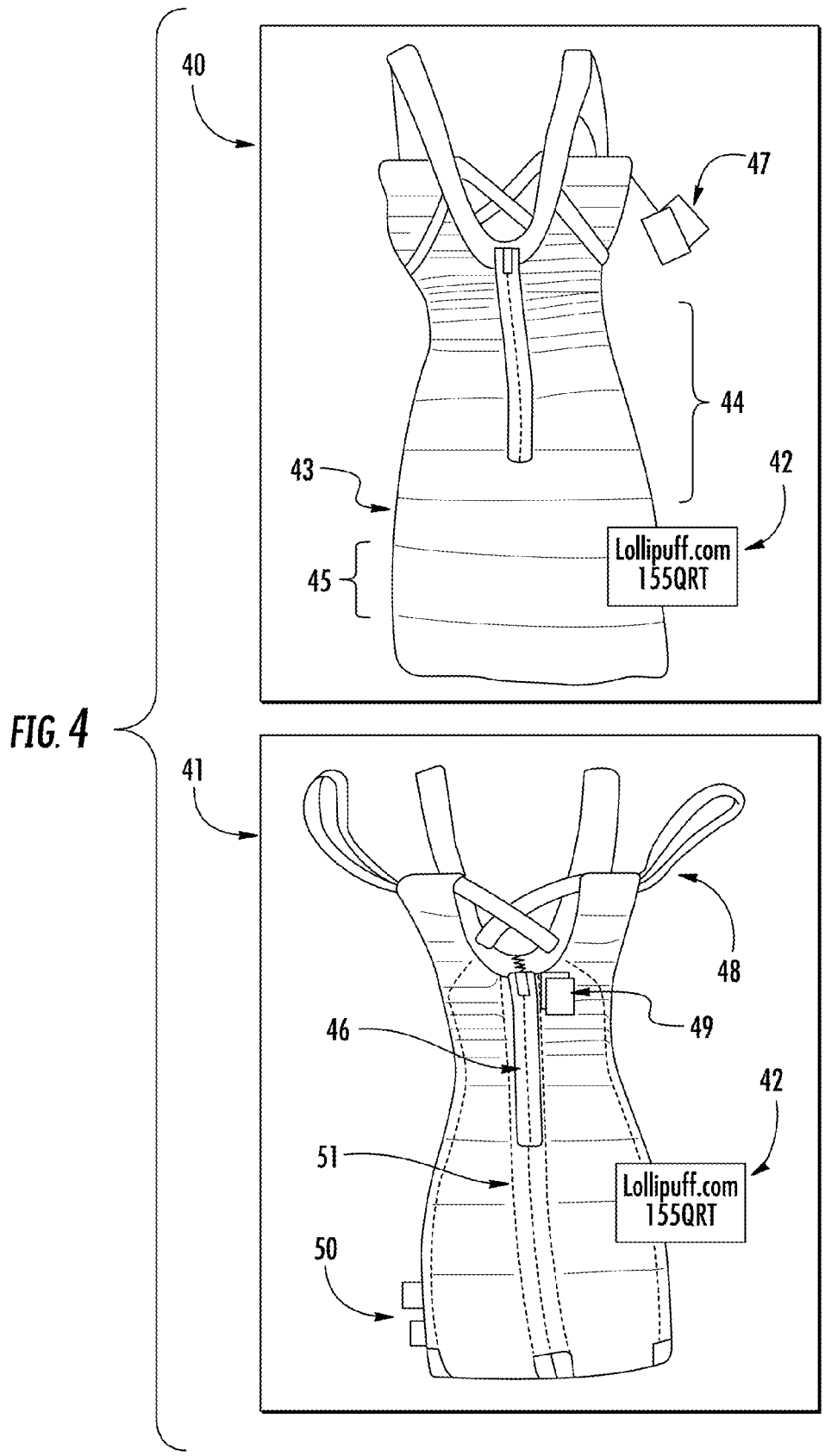
FIG. 4 is a representation of seller-provided photographs that contain the identification number and a series of visible key features.

FIG. 4 is a representation of seller-provided photographs of a Nerve Leger dress's back view 40 and inside out view 41, with 155QRT as the identification number 42. The seller-provided photographs show the identification number 42 with numerous key visible features such as: color 43, band pattern 44, band width 45, zipper 46, price tag 47, hang tag 48, designer label 49, care labels 50, and stitching 51.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A method for authenticating goods, comprising:
   receiving, at an authentication web server via the internet, a request from a seller of a good to authenticate the good, the authentication web server comprising one or more hardware processors;
   providing, by the authentication web server to the seller, an identification number;
   requesting, by the authentication web server from the seller, one or more photographs of the good, the request identifying one or more features of the good to be photographed, the identified features corresponding to features of an authentic good;
   receiving, at the authentication web server from the seller, one or more photographs of the good, each of one or more of the photographs showing one or more of the identified features and including the identification number visibly within the photograph;
   determining, by the authentication web server, if the good is authentic based on a comparison of the one or more identified features shown in the received photographs to features of the authentic good; and
   in response to determining that the good is authentic, providing, by the authentication web server to one or more of the seller and a potential buyer of the good, an indication that the good is authentic.

2. The method of claim 1, wherein at least one identified feature comprises information provided by a manufacturer of the good.

3. The method of claim 2, wherein the information provided by the manufacturer of the good comprises one or more of: a machine-readable tag, an electronic tag, a hologram, a clothing label, and an identification number uniquely identifying the good.

4. The method of claim 1, wherein the good comprises one of: a piece of clothing, a handbag, a pair of shoes, and a clothing accessory.

5. The method of claim 1, wherein the identification number is generated based on a current date and/or a current time.

6. The method of claim 1, wherein determining if the good is authentic comprises querying a database storing the information associated with features of the authentic good and/or features of corresponding counterfeit goods, and comparing the information associated with features of the authentic good and/or features of corresponding counterfeit goods to the one or more identified features shown in the received photographs.

7. The method of claim 6, wherein the comparison of the information associated with features of the authentic good and the one or more identified features shown in the received photographs is performed by an expert.

8. The method of claim 6, wherein the information associated with features of the authentic good comprises images showing the features of the authentic good.

9. The method of claim 8, further comprising, in response to determining that the good is authentic, storing the received photographs in the database.

10. The method of claim 6, wherein the information associated with features of the authentic good comprises one or more of: information associated with goods previously determined to be authentic, information provided by a manufacturer of the good, or information provided by a third party.

11. The method of claim 6, wherein the database categorizes stored information associated with features of the authentic good by feature type.

12. The method of claim 1, wherein determining if the good is authentic comprises generating a score representative of the likelihood of authenticity of the good.

13. The method of claim 12, wherein the generated score is decreased in response to the good comprising a frequently counterfeited good.

14. The method of claim 12, wherein the score is generated based at least in part on a reputation of the seller.

15. The method of claim 12, wherein providing an indication that the good is authentic comprises providing the generated score to one or more of the seller and a potential buyer.

16. The method of claim 1, wherein determining if the good is authentic further comprises verifying if the one or more received photographs have been altered or manipulated.

17. A system for authenticating goods, comprising:
an authentication web server comprising one or more processors and a non-transitory computer-readable storage medium storing executable instructions specially configured to, when executed by the processor, perform steps comprising:
receiving, via the internet, a request from a seller of a good to authenticate the good;
providing, to the seller, an identification number;
requesting, from the seller, one or more photographs of the good, the request identifying one or more features of the good to be photographed, the identified features corresponding to features of an authentic good;
receiving, from the seller, one or more photographs of the good, each of one or more of the photographs showing one or more of the identified features and including the identification number visibly within the photograph;
determining if the good is authentic based on a comparison of the one or more identified features shown in the received photographs to features of the authentic good; and
in response to determining that the good is authentic, providing to one or more of the seller and a potential buyer of the good, an indication that the good is authentic.

18. The system of claim 17, further comprising:
a database communicatively coupled to the web server, the database storing the information associated with features of the authentic good, and wherein determining if the good is authentic comprises:
accessing the stored information associated with features of the authentic good;
displaying the accessed information to a user of the system;
displaying the received one or more photographs of the good to the user of the system; and
receiving, at the authentication web server from the user of the system, the indication that the good is authentic.

19. A method for authenticating goods, comprising:
receiving, at an authentication web server via the internet, a request from a seller of a good to authenticate a good, the authentication web server comprising one or more hardware processors;
requesting, by the authentication web server, one or more photographs of the good, the request identifying one or more features of the good to be photographed, the identified features corresponding to features of an authentic good;
receiving, at the authentication web server, one or more photographs of the good, each of one or more of the photographs showing one or more of the identified features and including a unique alphanumeric identifier visibly within the photograph; and
providing, by the authentication web server, an indication that the good is authentic in response to a determination that the good is authentic, the determination based on the one or more identified features shown in the received photographs and the visible presence of the identifier within the received photographs.

* * * * *